(12) United States Patent
Kuwahara et al.

(10) Patent No.: US 11,734,811 B2
(45) Date of Patent: *Aug. 22, 2023

(54) INSPECTION SYSTEM AND INSPECTION METHOD

(71) Applicant: KABUSHIKI KAISHA TOSHIBA, Tokyo (JP)

(72) Inventors: Hiroaki Kuwahara, Yokohama (JP); Manabu Watanabe, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 251 days.

This patent is subject to a terminal disclaimer.

(21) Appl. No.: 17/132,334

(22) Filed: Dec. 23, 2020

(65) Prior Publication Data

US 2021/0110530 A1 Apr. 15, 2021

Related U.S. Application Data

(62) Division of application No. 16/176,401, filed on Oct. 31, 2018, now Pat. No. 10,902,578.

(30) Foreign Application Priority Data

Oct. 31, 2017 (JP) .................................. 2017-211303

(51) Int. Cl.
| | |
|---|---|
| *G06T 7/00* | (2017.01) |
| *G06T 7/11* | (2017.01) |
| *G06T 7/136* | (2017.01) |
| *G06T 7/90* | (2017.01) |
| *G01N 21/954* | (2006.01) |

(52) U.S. Cl.
CPC .............. *G06T 7/0004* (2013.01); *G06T 7/11* (2017.01); *G06T 7/136* (2017.01); *G06T 7/90* (2017.01); *G06T 2207/30164* (2013.01)

(58) Field of Classification Search
CPC ......... G06T 7/0004; G06T 7/11; G06T 7/136; G06T 7/90; G06T 2207/30164; G01N 21/954
See application file for complete search history.

(56) References Cited

U.S. PATENT DOCUMENTS

| | | | |
|---|---|---|---|
| 5,315,409 A | 5/1994 | Matsumura et al. | |
| 7,031,511 B2 | 4/2006 | Asai | |
| 7,679,746 B1 * | 3/2010 | Walton | G01N 15/088 356/432 |
| 8,699,037 B2 | 4/2014 | Cox | |
| 2005/0254700 A1 | 11/2005 | Nagata et al. | |

(Continued)

FOREIGN PATENT DOCUMENTS

| | | |
|---|---|---|
| CN | 101606448 A | 12/2009 |
| JP | 08-113816 | 5/1996 |

(Continued)

*Primary Examiner* — Asghar H Bilgrami
(74) *Attorney, Agent, or Firm* — Oblon, McClelland, Maier & Neustadt, L.L.P.

(57) ABSTRACT

According to one embodiment, an inspection system includes an illuminator, an imager, and a processor. The illuminator irradiates light into an interior of a hole. The imager acquires a first image by imaging the interior of the hole where the light is irradiated. The processor detecting a blockage of at least a portion of the hole based on a luminance of the hole inside the first image.

18 Claims, 10 Drawing Sheets

(56) References Cited

U.S. PATENT DOCUMENTS

| | | | | |
|---|---|---|---|---|
| 2011/0125423 A1* | 5/2011 | Allen | ............... | G01M 99/002 |
| | | | | 702/47 |
| 2012/0146432 A1* | 6/2012 | Kim | ............... | H02K 41/0356 |
| | | | | 310/12.16 |
| 2013/0047748 A1 | 2/2013 | Visintin | | |
| 2015/0080256 A1* | 3/2015 | Gambini | ............ | G01N 21/6452 |
| | | | | 506/9 |
| 2017/0132775 A1 | 5/2017 | Ramamurthy et al. | | |
| 2017/0356730 A1* | 12/2017 | Wang | ............... | F42D 1/22 |
| 2020/0116914 A1* | 4/2020 | Goss | ............... | H04N 7/181 |

FOREIGN PATENT DOCUMENTS

| | | |
|---|---|---|
| JP | 2000-180374 A | 6/2000 |
| JP | 2005-326227 A1 | 11/2005 |
| JP | 2008-102011 A | 5/2008 |
| JP | 2011-89826 A | 5/2011 |
| JP | 2012-112688 A | 6/2012 |
| JP | 2014-020328 | 2/2014 |
| JP | 2015-163857 A | 9/2015 |
| JP | 5966194 | 8/2016 |
| JP | 2017-090456 | 5/2017 |

\* cited by examiner

INSPECTION SYSTEM AND INSPECTION METHOD

CROSS-REFERENCE TO RELATED APPLICATIONS

This application is a Divisional of U.S. Application Ser. No. 16/176,401 filed on Oct. 31, 2018, which is based upon and claims the benefit of priority from Japanese Patent Application No. 2017-211303, filed on Oct. 31, 2017; the entire contents of each of which are incorporated herein by reference.

FIELD

Embodiments described herein relate generally to an inspection system and an inspection method.

BACKGROUND

An inspection system and an inspection method have been proposed that use a robot to inspect the gap between a rotor and a stator of a generator. Many vent holes are provided in the rotor. A gas (a cooling gas) flows in the vent holes and suppresses a temperature increase of the rotor. In the case where a blockage occurs in at least a portion of the vent holes, the flow rate of the gas passing through the vent holes decreases; and the temperature of the rotor increases. When the temperature of the rotor increases, thermal expansion of members included in the rotor occurs; and an abnormal vibration of the rotor, etc., may occur. Therefore, an inspection of the generator is performed to check for blockage of the vent holes. It is desirable to develop an inspection system and an inspection method to perform the inspection more accurately.

DETAILED DESCRIPTION

According to one embodiment, an inspection system includes an illuminator, an imager, and a processor. The illuminator irradiates light into an interior of a hole. The imager acquires a first image by imaging the interior of the hole where the light is irradiated. The processor detecting a blockage of at least a portion of the hole based on a luminance of the hole inside the first image.

An inspection system according to an embodiment is used to inspect holes provided in infrastructure equipment such as a generator, etc. Hereinbelow, the case will be described where the inspection system according to the embodiment is used to inspect vent holes provided in a rotor of a generator.

The schematic configuration of the generator will now be described.

Figure 1A:
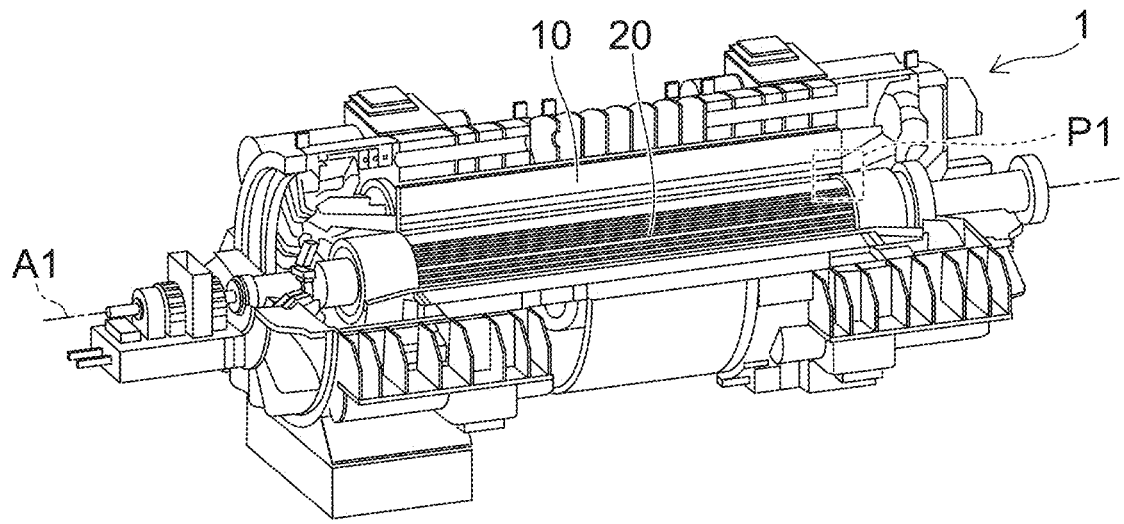
FIGS. 1A and 1B are perspective views illustrating the generator.
Figure 1B:
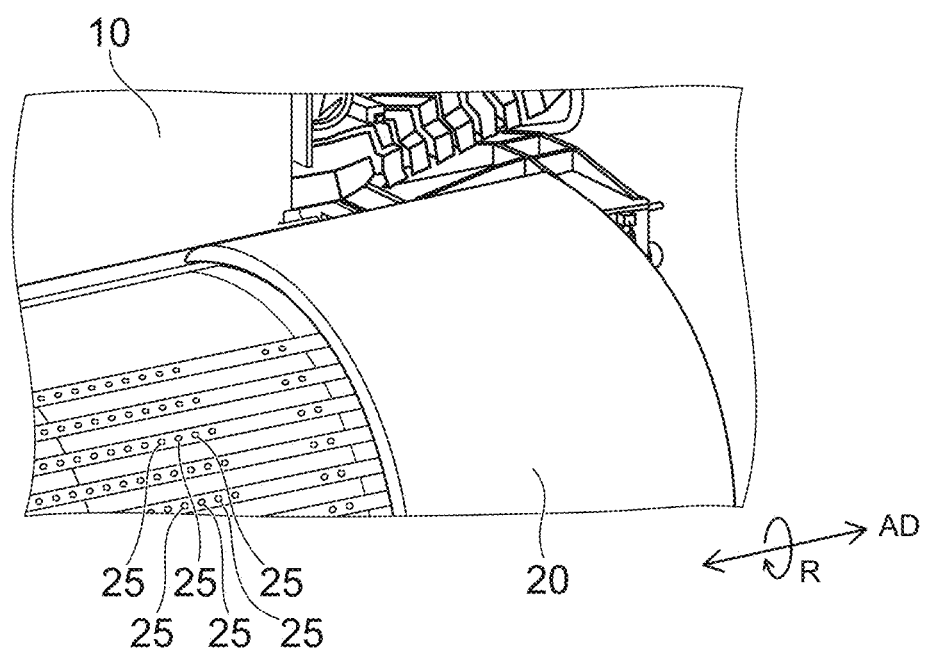

FIGS. 1A and 1B are perspective views illustrating the generator.

A portion of the generator 1 is not illustrated in FIG. 1A to illustrate the internal structure of the generator 1. FIG. 1B is a perspective view in which portion P1 of FIG. 1A is enlarged.

As illustrated in FIG. 1A, the generator 1 includes a stator 10 and a rotor 20. The rotor 20 rotates with a rotation axis A1 at the center. The stator 10 is provided around the rotor 20. The direction from the stator 10 toward the rotor 20 is perpendicular to the rotation axis A1.

As illustrated in FIG. 1B, multiple vent holes 25 are provided in the surface of the rotor 20. The multiple vent holes 25 are arranged along an axial direction AD of the rotation axis A1 and a rotation direction R of the rotor 20.

For example, the inspection system according to the embodiment inspects the rotor 20 in a state in which the rotor 20 is removed from the stator 10. Or, as described below, the inspection system according to the embodiment may include a robot moving between the stator 10 and the rotor 20. In such a case, the rotor 20 can be inspected in a state in which the rotor 20 is disposed on the inner side of the stator 10.

Figure 2:
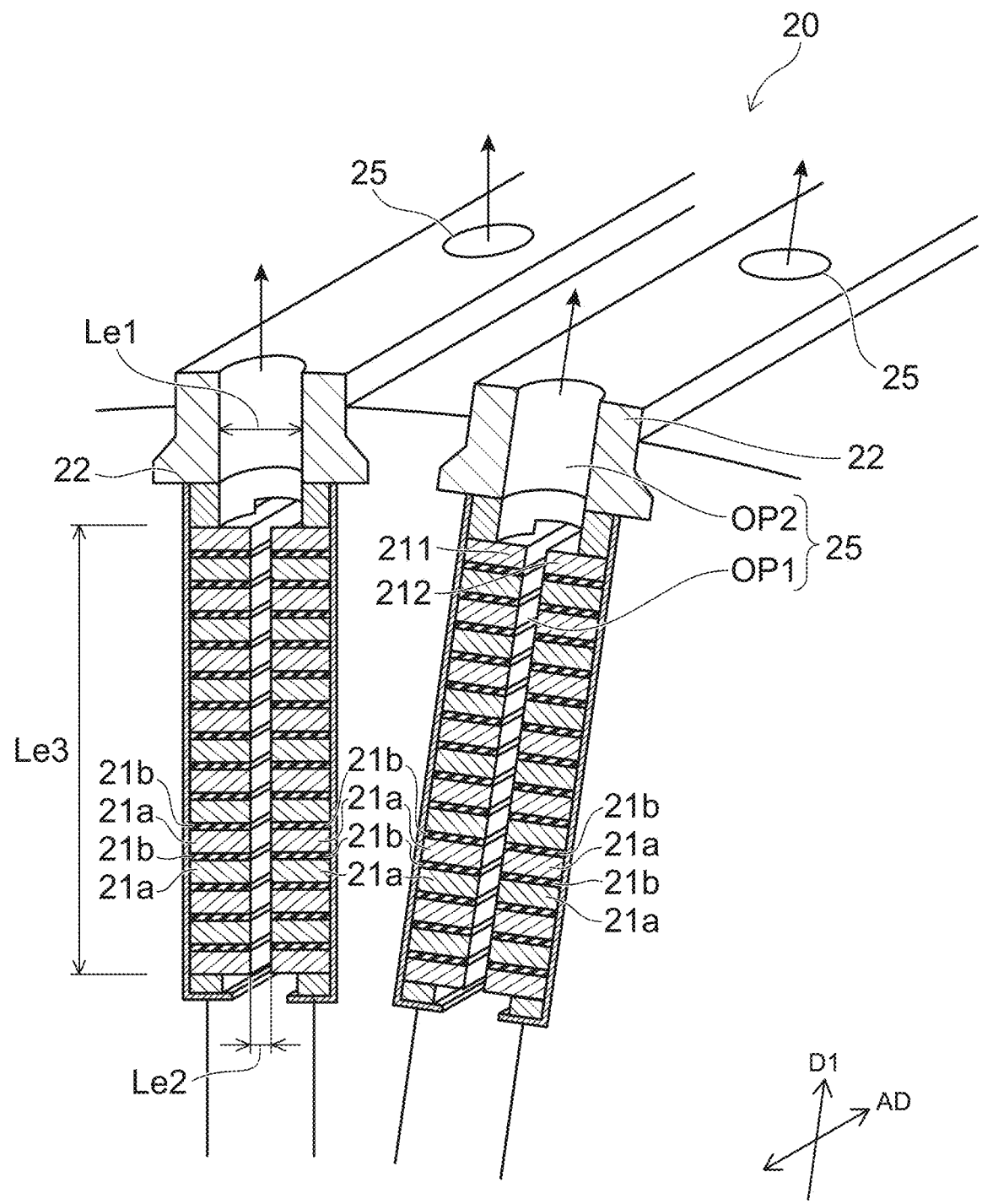
FIG. 2 is a perspective cross-sectional view illustrating the vent hole vicinity of the rotor included in the generator.

FIG. 2 is a perspective cross-sectional view illustrating the vent hole vicinity of the rotor included in the generator.

As illustrated in FIG. 2, the rotor 20 includes a stacked body 21 and a wedge (a fixing member) 22. The stacked body 21 includes multiple coils 21a and multiple insulating bodies 21b. The multiple coils 21a and the multiple insulating bodies 21b are provided alternately in a first direction D1 from the rotor 20 toward the stator 10. An example of the first direction D1 is shown in FIG. 2. The wedge 22 is provided on the stacked body 21 and fixes the stacked body 21. The wedge 22 is exposed at the surface of the rotor 20.

A first opening OP1 that pierces the stacked body 21 in the first direction D1 is provided in the stacked body 21. A second opening OP2 that pierces the wedge 22 in the first direction D1 is provided in the wedge 22. The vent hole 25 is formed of the first opening OP1 and the second opening OP2 overlapping in the first direction D1.

A portion of the stacked body 21 overlaps the second opening OP2 in the first direction D1. In the example illustrated in FIG. 2, the stacked body 21 includes a first portion 211 and a second portion 212 overlapping the second opening OP2. The first portion 211 and the second portion 212 are separated from each other. The first opening OP1 is positioned between the first portion 211 and the second portion 212.

As an example, a length Le1 of the second opening OP2 in a direction perpendicular to the first direction D1 is 16 mm. A length Le2 of the first opening OP1 in this direction is 3 mm. A length Le3 of the first opening OP1 in the first direction D1 is 150 mm.

Figure 3:
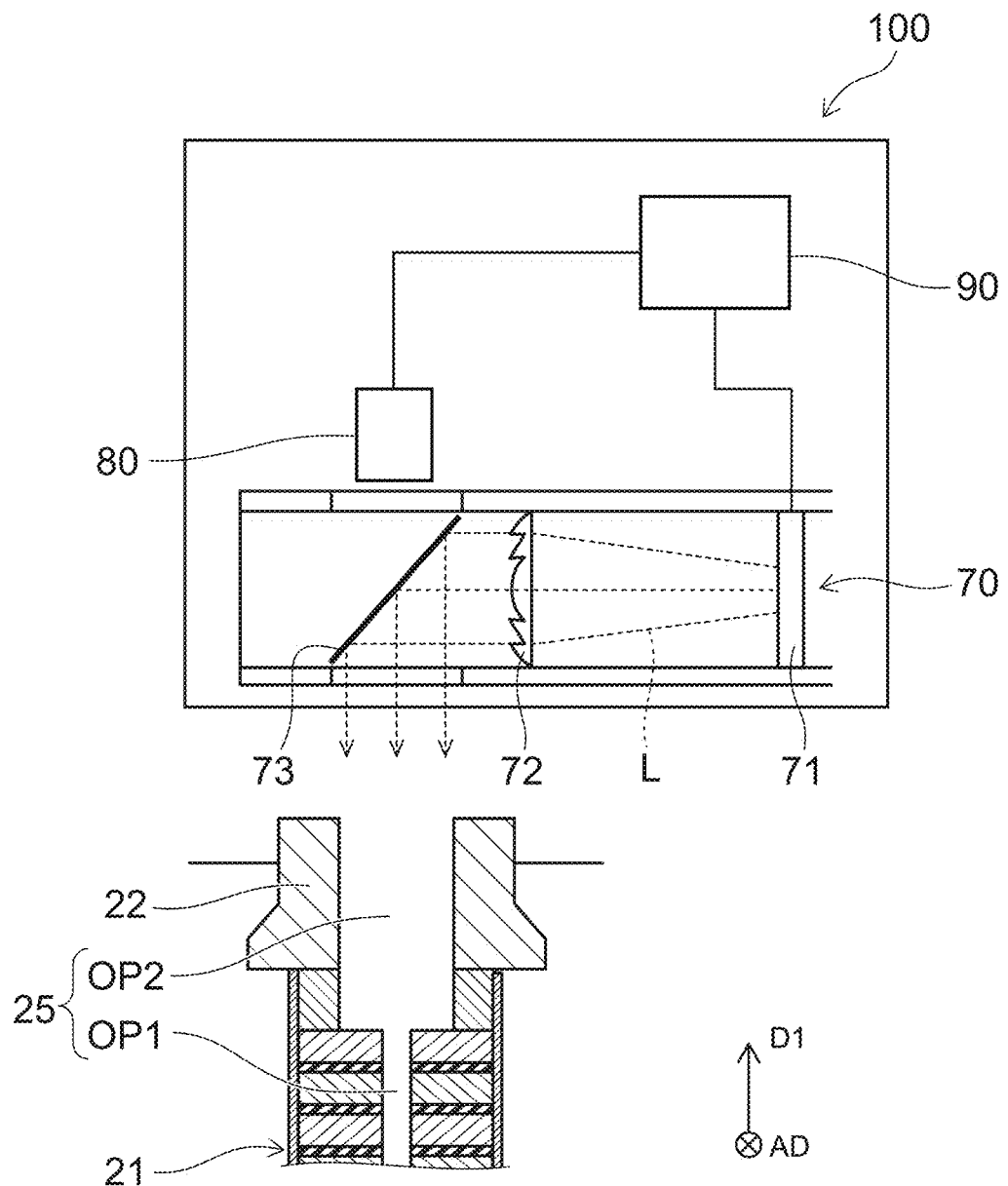
FIG. 3 is a schematic view illustrating the configuration of the inspection system according to the embodiment.

FIG. 3 is a schematic view illustrating the configuration of the inspection system according to the embodiment.

As illustrated in FIG. 3, the inspection system 100 according to the embodiment includes an illuminator 70, an imager 80, and a processor 90.

The illuminator 70 irradiates light into the interior of the vent hole 25. The imager 80 acquires a first image by imaging the interior of the vent hole 25 where the light is irradiated. The imager 80 transmits the first image to the processor 90. The processor 90 detects a blockage in at least a portion of the vent hole 25 based on the luminance of the vent hole 25 inside the first image. In other words, a constriction or a blockage of the vent hole 25 is detected. Hereinbelow, the blockage in at least a portion of the vent hole 25 is called an "abnormality" of the vent hole 25. Also, the state in which there is no constriction or blockage is called the "normal" state.

One device may include the illuminator 70, the imager 80, and the processor 90. One device may include the illuminator 70 and the imager 80; and another device may include the processor 90. In such a case, the device that includes the illuminator 70 and the imager 80 is connected by wired communication or wireless communication to the device including the processor 90.

As illustrated in FIG. 3, the illuminator 70 includes a light source 71, a lens 72, and a mirror 73.

The light source 71 is, for example, an LED (Light Emitting Diode). The light source 71 radiates light toward the mirror 73. The lens 72 is provided between the light source 71 and the mirror 73. For example, the light that is radiated from the light source 71 spreads in a radial configuration. The lens 72 is a plano-convex lens (e.g., a Fresnel lens). The lens 72 refracts the radiated light to be aligned with the direction from the light source 71 toward the mirror 73. Thereby, parallel light is emitted from the lens 72 toward the mirror 73. The light that is refracted by the lens 72 is reflected toward the vent hole 25 by the mirror 73. The mirror 73 is positioned between the vent hole 25 and the imager 80 when the vent hole 25 is imaged by the imager 80. The mirror 73 is, for example, a half mirror.

An inspection method according to the inspection system according to the embodiment will now be described in detail.

Figure 4:
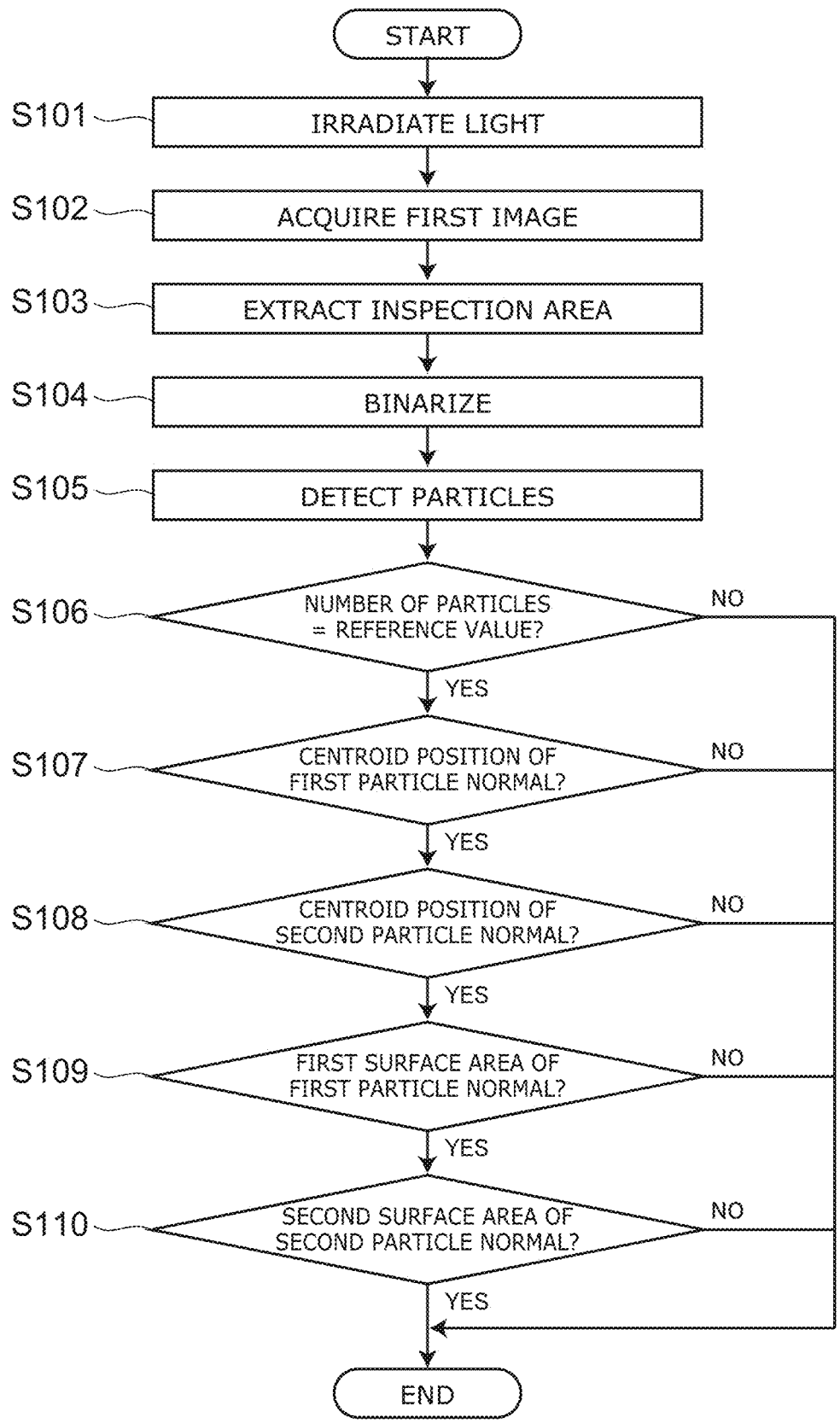
FIG. 4 is a flowchart illustrating the inspection method according to the inspection system according to the embodiment.

FIG. 4 is a flowchart illustrating the inspection method according to the inspection system according to the embodiment.

Figure 5A:
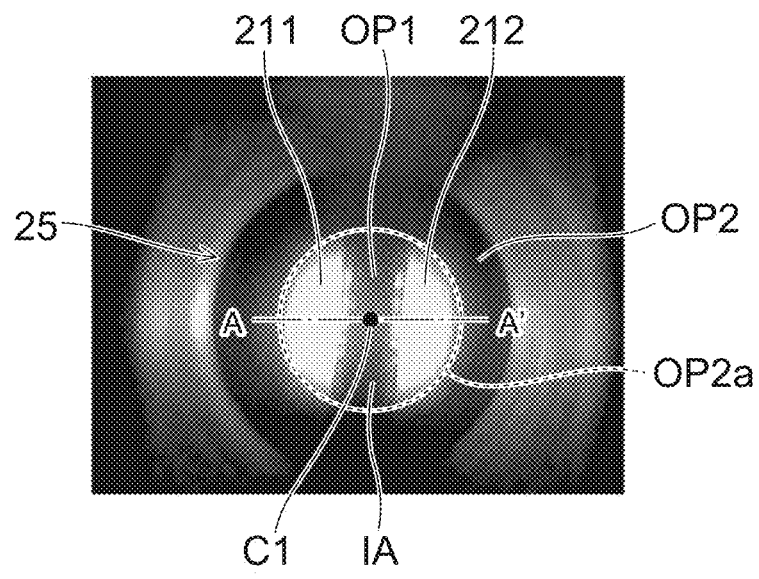
FIGS. 5A to 5C are drawings for describing the inspection system according to the embodiment.
Figure 5B:
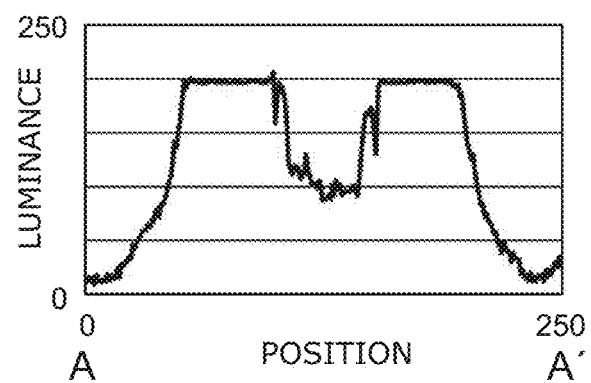
Figure 5C:
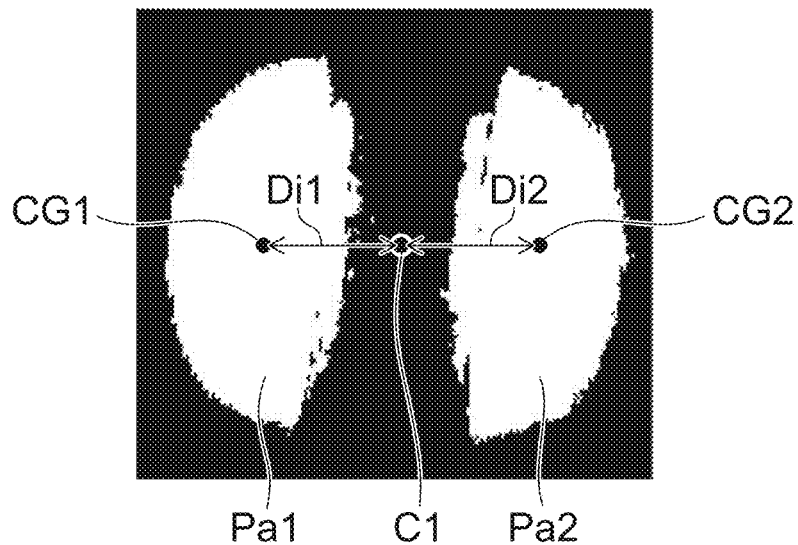

FIGS. 5A to 5C are drawings for describing the inspection system according to the embodiment.

FIGS. 5A to 5C illustrate images and data based on a state in which there is no abnormality in the vent hole 25.

The illuminator 70 irradiates the light toward the interior of the vent hole 25 (step S101). The imager 80 acquires the first image by imaging the vent hole 25 interior where the light is irradiated (step S102). FIG. 5A is an example of the first image.

As illustrated in FIG. 5A, the processor 90 detects an outer edge OP2a of the second opening OP2 included in the first image. The outer edge OP2a is, for example, circular. The outer edge of the second opening OP2 lower end is detected in the example illustrated in FIG. 5A. The processor 90 extracts the area surrounded with the outer edge OP2a as an inspection area IA (step S103). For example, the processor 90 extracts the area surrounded with the outer edge OP2a as the inspection area IA by masking the area at the outer edge OP2a periphery.

The processor 90 binarizes the inspection area IA (step S104). Thereby, a binary image is generated. By the binarization, the portions where the luminance is relatively high are converted into a first color; and the portions where the luminance is relatively low are converted into a second color. The first color is different from the second color. The case will now be described where the first color is white and the second color is black.

FIG. 5B illustrates the luminance at each position along line A-A' of FIG. 5A. From FIG. 5B, it can be seen that the luminance is relatively high at the positions where the stacked body 21 is provided; and the luminance is relatively low at the position of the first opening OP1. Accordingly, in the binary image as illustrated in FIG. 5C, the stacked body 21 is illustrated by white; and the first opening OP1 is illustrated by black.

The processor 90 detects the white particles from the binary image (step S105). Specifically, the processor 90 detects a cluster of white points having at least a preset surface area to be a particle.

The processor 90 inspects the abnormality of the vent hole 25 based on the detected particles.

Specifically, the processor 90 executes the following step S106 to step S110.

The processor 90 verifies whether or not the number of particles included in the binary image matches a preset reference value (step S106). When looking into the vent hole 25 in the example illustrated in FIG. 5A, the first portion 211 and the second portion 212 of the stacked body 21 separated by the first opening OP1 are viewed. In such a case, the reference value is set to 2. In the case where there is an abnormality in the vent hole 25 (the first opening OP1), the number of particles may be different from the reference value. Accordingly, in the case where the number of detected particles is different from the reference value, the processor 90 determines that there is an abnormality in the vent hole 25; and the inspection ends.

The processor 90 determines whether or not the position of a centroid CG1 of a first particle Pa1 is normal (step S107). For example, the processor 90 determines a center C1 of the outer edge OP2a as illustrated in FIG. 5A. As illustrated in FIG. 5C, the processor 90 sets the particle on one side of the center C1 to be the first particle Pa1 and sets the other particle on the other side of the center C1 to be a second particle Pa2. The first particle Pa1 corresponds to the first portion 211 of the stacked body 21. The processor 90 calculates the position of the centroid CG1 of the first particle Pa1. For example, as illustrated in FIG. 5C, the processor 90 calculates a first distance Di1 between the centroid CG1 of the first particle Pa1 and the center C1. In the case where the first distance Di1 is not within a preset first range (a distance range), the processor 90 determines the position of the centroid CG1 to be abnormal. In the case where it is determined that the position of the centroid CG1 is abnormal, the processor 90 determines that there is an abnormality in the vent hole 25; and the inspection ends.

The processor 90 determines whether or not the position of a centroid CG2 of the second particle Pa2 is normal (step S108). The second particle Pa2 corresponds to the second portion 212 of the stacked body 21. This determination method is similar to the determination method of the centroid CG1 of the first particle Pa1 described above. In other words, the processor 90 calculates a second distance Di2 between the centroid CG2 of the second particle Pa2 and the center C1. In the case where the second distance Di2 is not within a preset second range, the processor 90 determines the position of the centroid CG2 to be abnormal. For example, the same values as the upper limit and the lower limit of the first range are respectively set as the upper limit and the lower limit of the second range.

The processor 90 determines whether or not the surface area of the first particle Pa1 is normal (step S109). For example, the processor 90 calculates a first surface area of the first particle Pa1. In the case where the first surface area is not within a preset third range (a surface area range), the processor 90 determines the first surface area to be abnormal. In the case where it is determined that the first surface area of the first particle Pa1 is abnormal, the processor 90 determines that there is an abnormality in the vent hole 25; and the inspection ends.

The processor 90 determines whether or not a second surface area of the second particle Pa2 is normal (step S110). This determination method is similar to the determination method of the first surface area of the first particle Pa1 described above. In other words, the processor 90 calculates the second surface area. In the case where the second surface area is not within a preset fourth range, the processor 90 determines the second surface area to be abnormal.

For example, in the case where there is an abnormality in the vent hole 25, the sizes, the configurations, etc., of the particles change. Thereby, the centroids and the surface areas of the particles also may change. Therefore, it can be verified whether or not the vent hole 25 is normal by verifying whether or not the centroids and the surface areas of the particles are normal.

Figure 6A:
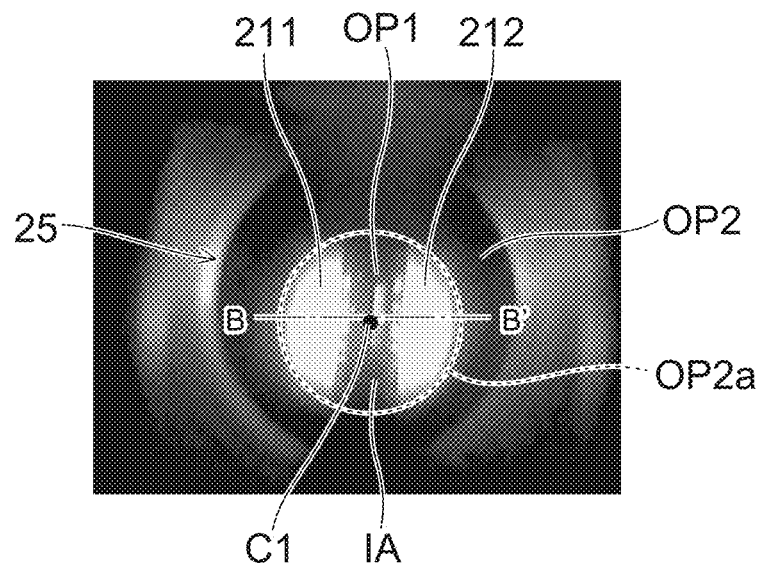
FIGS. 6A to 6C are drawings for describing the processing according to the inspection system according to the embodiment.
Figure 6B:
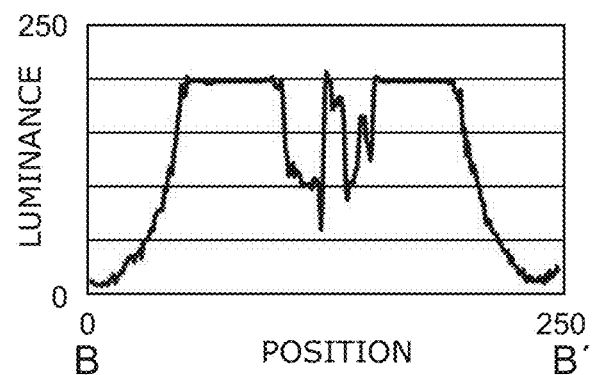
Figure 6C:
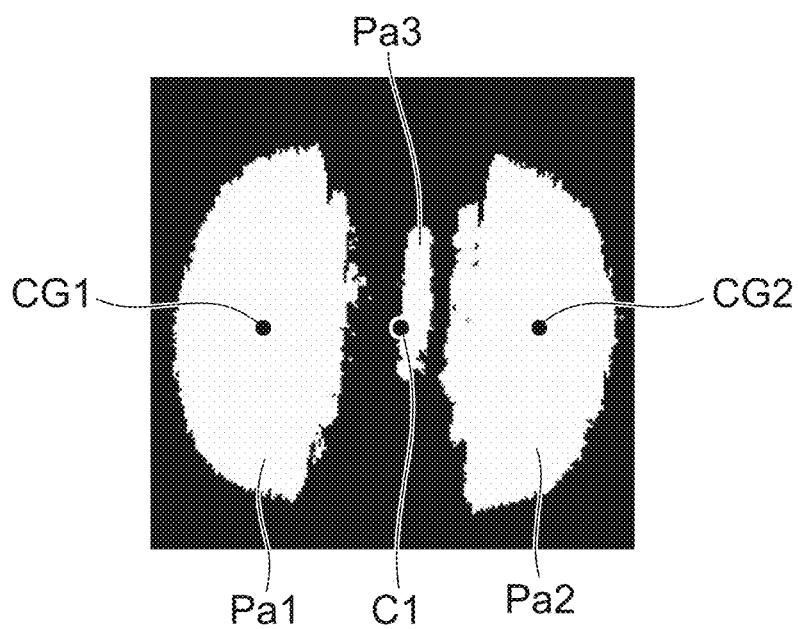

FIGS. 6A to 6C are drawings for describing the processing according to the inspection system according to the embodiment.

FIGS. 6A to 6C illustrate images and data based on the state in which the vent hole is blocked, FIG. 6A illustrates the first image in the state in which the first opening OP1 is blocked due to shifting of the insulating body 21b. FIG. 6B illustrates the luminance at each point along line B-B' of FIG. 6A. From FIG. 6A and FIG. 6B, it can be seen that an object that reflects the light exists between the first portion 211 and the second portion 212 of the stacked body 21.

The binary image illustrated in FIG. 6C is obtained by binarizing the first image illustrated in FIG. 6A. In the example illustrated in FIG. 6C, the processor 90 detects another particle Pa3 between the first particle Pa1 corresponding to the first portion 211 and the second particle Pa2 corresponding to the second portion 212. Accordingly, in step S106 of the flowchart illustrated in FIG. 4, the number of particles does not match the reference value; and the processor 90 determines the vent hole 25 to be abnormal.

Effects of the embodiment will now be described.

For example, there are cases where at least a portion of the vent hole 25 is blocked due to shifting of the insulating body 21b. As illustrated in FIG. 2, the width (the length Le2) of the first opening OP1 is extremely narrow compared to the length Le3 in the first direction D1 of the first opening OP1. Therefore, particularly on the depthward side (the rotation axis A1 side) of the vent hole 25, it is not easy to inspect an abnormality. Although the inspection of the vent hole 25 conventionally has been performed by viewing by a human as well, it has been difficult to perform an accurate inspection. A method also has been performed in which the vent hole 25 interior is viewed directly by inserting an endoscope into the vent hole 25; but much time is necessary for the inspection.

In the inspection system 100 and the inspection method according to the embodiment, the first image of the vent hole 25 interior where the light is irradiated is acquired. The inventors discovered that the abnormality of the vent hole 25 can be detected more accurately based on the luminance of the vent hole 25 inside the first image. In other words, according to the inspection system 100 according to the first embodiment, the abnormality of the vent hole 25 can be detected more accurately. Also, according to the inspection system 100 according to the first embodiment, because the abnormality is detected based on the image, the time that is necessary for the inspection can be greatly reduced compared to the case where an endoscope is used.

The illuminator 70 that has the configuration illustrated in FIG. 3 is used favorably in the inspection system 100 and the inspection method according to the embodiment. According to the illuminator 70, the light can be irradiated toward the vent hole 25 along the first direction D1. Thereby, the depthward side of the vent hole 25 can be illuminated sufficiently; and the abnormality on the depthward side of the vent hole 25 can be detected more accurately.

As illustrated in FIGS. 5A to 5C, it is desirable to extract the inspection area IA on the inner side of the outer edge OP2a and to detect the abnormality of the vent hole 25 based on the inspection area IA. Thereby, objects that are unrelated to the vent hole 25 can be excluded from the binary image.

Accordingly, unintended particles unrelated to the vent hole 25 can be prevented from being included in the binary image; and the accuracy of the detection of the abnormality can be increased.

In the inspection method illustrated in FIG. 4, the abnormality of the vent hole 25 is detected based on the number of particles, the centroids of the particles, and the surface areas of the particles. By inspecting using these three parameters, the abnormality of the vent hole 25 can be detected more accurately. However, in the inspection according to the inspection system 100 according to the embodiment, the abnormality of the vent hole 25 may be detected based on one or two of these parameters. Even in such a case, the abnormality of the vent hole 25 can be detected with sufficient accuracy.

In the determination of the abnormality relating to the centroid, for example, the first distance Di1 is calculated based on coordinates in the first image. The first range that is compared to the first distance ai1 is set based on the coordinates in the first image.

Or, in step S107, the processor 90 may execute the following processing when calculating the centroid CG1. The processor 90 may calculate the first distance Di1 represented by a dimension in real space by using the distance in the first image, the focal length of the imager 80, and the size of the image sensor included in the imager 80. In such a case, the upper limit and the lower limit of the first range are represented by dimensions in real space.

As an example, the processor 90 calculates an angle of view θ in a second direction perpendicular to the first direction D1 by using the following Formula (1).

$$\theta = 2 \times \arctan(L1 \times L2/2) \quad (1)$$

L1 is the focal length of the imager 80. L2 is the length in the second direction of the image sensor included in the imager 80. Based on the following Formula (2), the processor 90 calculates an actual dimension L4 in the second direction of the first image by using the angle of view and a distance L3 between the lens of the imager 80 and the stacked body 21.

$$L4 = 2 \times L3 \times \tan(\theta/2) \quad (2)$$

The processor 90 calculates the proportion of the distance (the number of pixels) between the centroid CG1 and a center C2 in the first image to the number of pixels in the second direction of the first image. The processor 90 calculates the first distance Di1 represented by an actual dimension by multiplying the actual dimension L4 by the proportion.

According to this method, the first range that is based on the actual distance can be preset by measuring the actual distance between the center of the vent hole 25 and the centroid of the first portion 211. Accordingly, it is unnecessary to set the first range based on the coordinates in the first image. For example, a manager, the manufacturer of the inspection system 100, etc., can preset the first range by measuring the actual distance recited above; the work to be performed by the worker inspecting the vent hole 25 can be reduced; and the burden of the worker can be relaxed.

Similarly, in step S108 as well, the second distance Di2 that is represented by a dimension in real space may be calculated. In such a case, the second range that is based on the actual distance is set by measuring the actual distance between the center of the vent hole 25 and the centroid of the second portion 212.

In step S109, the processor 90 may calculate the first surface area represented by dimensions in real space. The first surface area is calculated using the surface area of the first particle Pa1 in the first image, the focal length of the imager 80, and the size of the image sensor included in the imager 80. Even in such a case, by measuring the actual surface area of the first portion 211 and by presetting the third range based on the actual surface area, it is unnecessary to set the third range based on the coordinates in the first image.

Similarly, in step S110 as well, the second surface area that is represented by dimensions in re& space may be calculated; and the comparison with the second surface area may be performed. In such a case, the actual surface area of the second portion 212 is measured; and the fourth range is set based on the actual surface area.

By further investigating the technology recited above, the inventors discovered the following.

In the case where the abnormality is detected based on the centroid of the particle, it is desirable for the lower limit of the first range to be set to be not less than 0.6 times and not more than 0.8 times the actual distance between the first portion 211 and the center of the second opening OP2. It is desirable for the upper limit of the first range to be set to be not less than 1.2 times and not more than 1.4 times this actual distance. Similarly, it is desirable for the lower limit and the upper limit of the second range compared to the second distance Di2 to be respectively set to be not less than 0.6 times and not more than 0.8 times and not less than 1.2 times and not more than 1.4 times the actual distance between the second portion 212 and the center of the second opening OP2.

In the case where the abnormality is detected based on the surface area of the particle, it is desirable for the lower limit of the third range compared to the first surface area to be set to be not less than 0.90 times and not more than 0.99 times the actual surface area of the first portion 211. It is desirable for the upper limit of the third range to be set to be not less than 1.01 times and not more than 1.10 times this actual surface area. Similarly, it is desirable for the lower limit and the upper limit of the fourth range compared to the second surface area to be respectively set to be not less than 0.90 times and not more than 0.99 times and not less than 1.01 times and not more than 1.10 times the actual surface area of the second portion 212.

The inventors discovered that the detection accuracy of the inspection system 100 and the inspection method according to the embodiment can be increased by employing the ranges recited above.

Instead of steps S107 and S108, the processor 90 may calculate the centroid of the entire particle. In such a case, the processor 90 calculates the distance between the centroid of the entirety and the center C1 and determines the position of the centroid to be abnormal in the case where the distance is not within a preset range.

Instead of steps S109 and S110, the processor 90 may calculate the surface area of the entire particle. In such a case, the processor 90 determines the surface area to be abnormal in the case where the surface area of the entirety is not within a preset range.

By these methods as well, the abnormality of the vent hole 25 can be detected. However, there are cases where the centroid or the surface area of the entirety does not change even when the centroids or the surface areas of the particles change. Accordingly, to increase the detection accuracy of the abnormality of the vent hole 25, it is desirable to determine the abnormality of the vent hole 25 based on the centroids and the surface areas of the particles as illustrated in steps S107 to S110.

The case is described in the example described above where two separated locations (the first portion 211 and the second portion 212) of the stacked body 21 are viewed through the second opening OP2. The invention according to the embodiment is not limited to this example. The invention according to the embodiment is applicable also in the case where one location of the stacked body 21 is viewed or three or more separate locations of the stacked body 21 are viewed through the second opening OP2. Even in such cases, based on the binary image, it is possible to accurately verify whether or not the vent hole 25 is normal by verifying whether or not the number of particles, the centroid of each particle, and the surface area of each particle are normal.

Figure 7A:
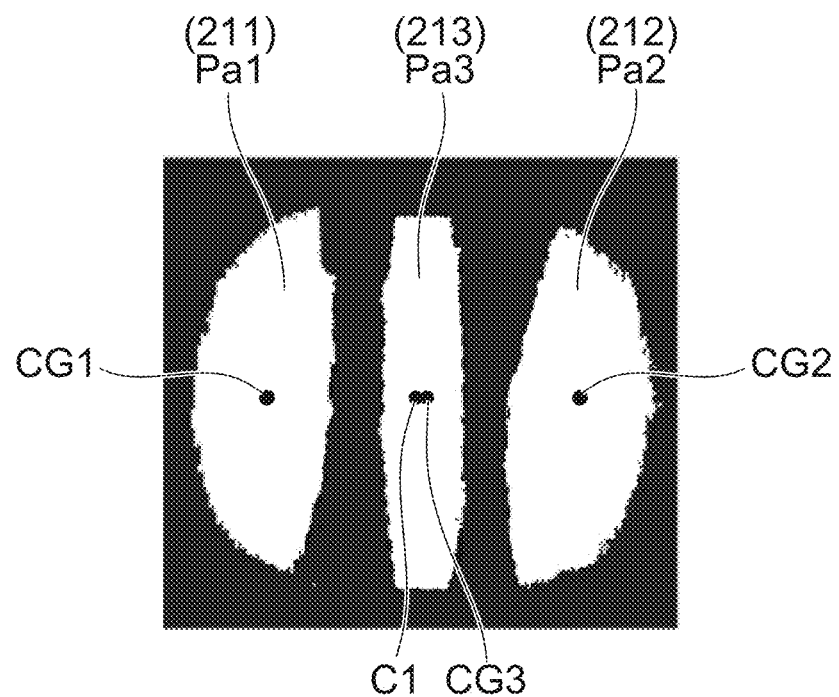
FIGS. 7A and 7B are examples of other binary images obtained by the inspection system according to the embodiment.
Figure 7B:
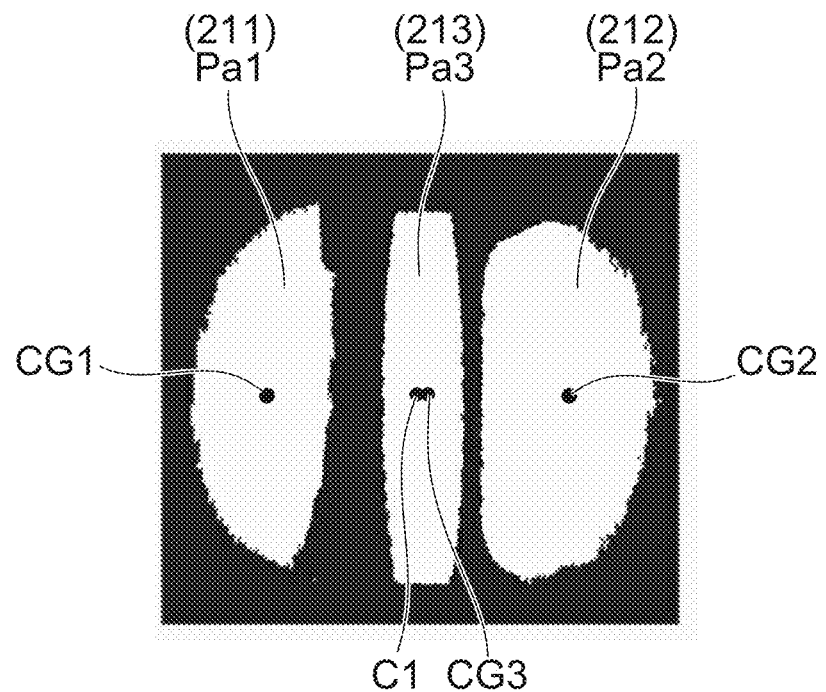

FIGS. 7A and 7B are examples of other binary images obtained by the inspection system according to the embodiment.

FIGS. 7A and 7B illustrate a binary image in the case where two first openings OP1 are provided. In such a case, three mutually-separated locations of the stacked body 21 are viewed through the second opening OP2.

FIG. 7A illustrates a binary image based on the vent hole 25 in the normal state. The three particles of the first particle Pa1, the second particle Pa2, and the third particle Pa3 are illustrated in the binary image of FIG. 7A. The third particle Pa3 corresponds to a third portion 213 positioned between the first portion 211 and the second portion 212.

In the case where three particles are viewed in the state in which the vent hole 25 is normal, the reference value is set to 3 in the flowchart illustrated in FIG. 4. Also, for example, in the flowchart illustrated in FIG. 4, a step of determining whether or not the position of a centroid CG3 of the third particle Pa3 is normal and a step of determining whether or not the surface area of the third particle Pa3 is normal are further executed.

FIG. 7B illustrates a binary image based on a state in which a portion of the first opening OP1 between the second portion 212 and the third portion 213 is blocked. Compared to the binary image illustrated in FIG. 7A, the surface area of the second particle Pa2 and the position of the second centroid CG2 have changed. In such a case, for example, the abnormality of the vent hole 25 is detected by determining the position of the second centroid CG2 and the surface area of the second particle Pa2 to be abnormal.

Thus, the specific detection method of the inspection system 100 and the inspection method according to the embodiment can be modified appropriately according to the appearance of the stacked body 21 through the second opening OP2.

Second Embodiment

Figure 8:
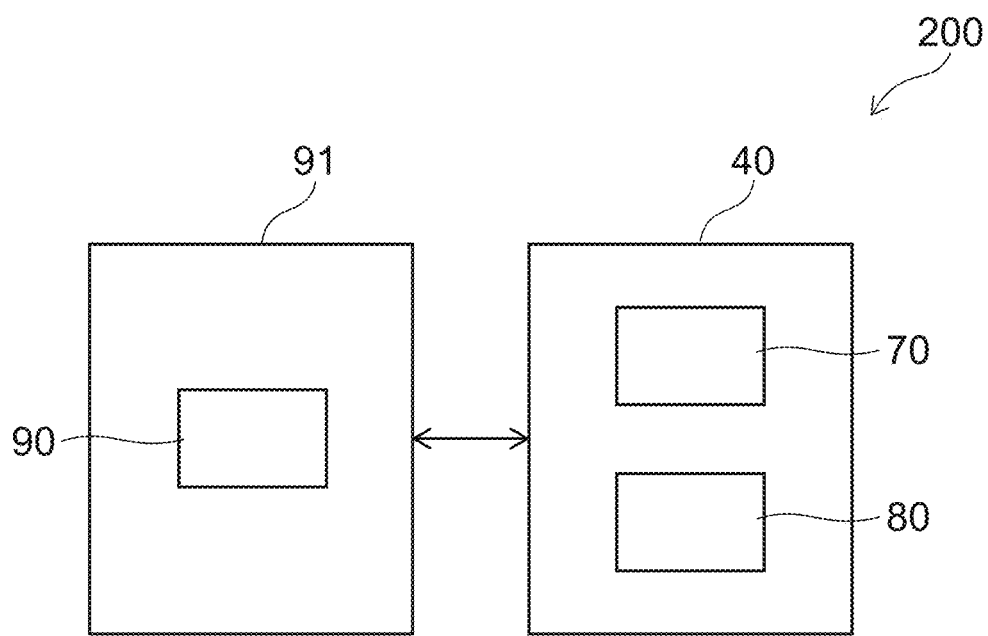
FIG. 8 is a block diagram illustrating the configuration of an inspection system according to a second embodiment.

FIG. 8 is a block diagram illustrating the configuration of an inspection system according to a second embodiment.

The inspection system 200 according to the second embodiment includes a robot 40. For example, as illustrated in FIG. 8, the robot 40 includes the illuminator 70 and the imager 80. The robot 40 is connected by wired communication or wireless communication to a terminal 91 including the processor 90. Or, the inspection system 200 according to the embodiment may be realized by mounting the processor 90 in the robot 40.

The processor 90 detects the blockage in at least a portion of the vent hole 25 based on the image acquired by the imager 80. Also, the processor 90 controls the operations of the robot 40.

Figure 9:
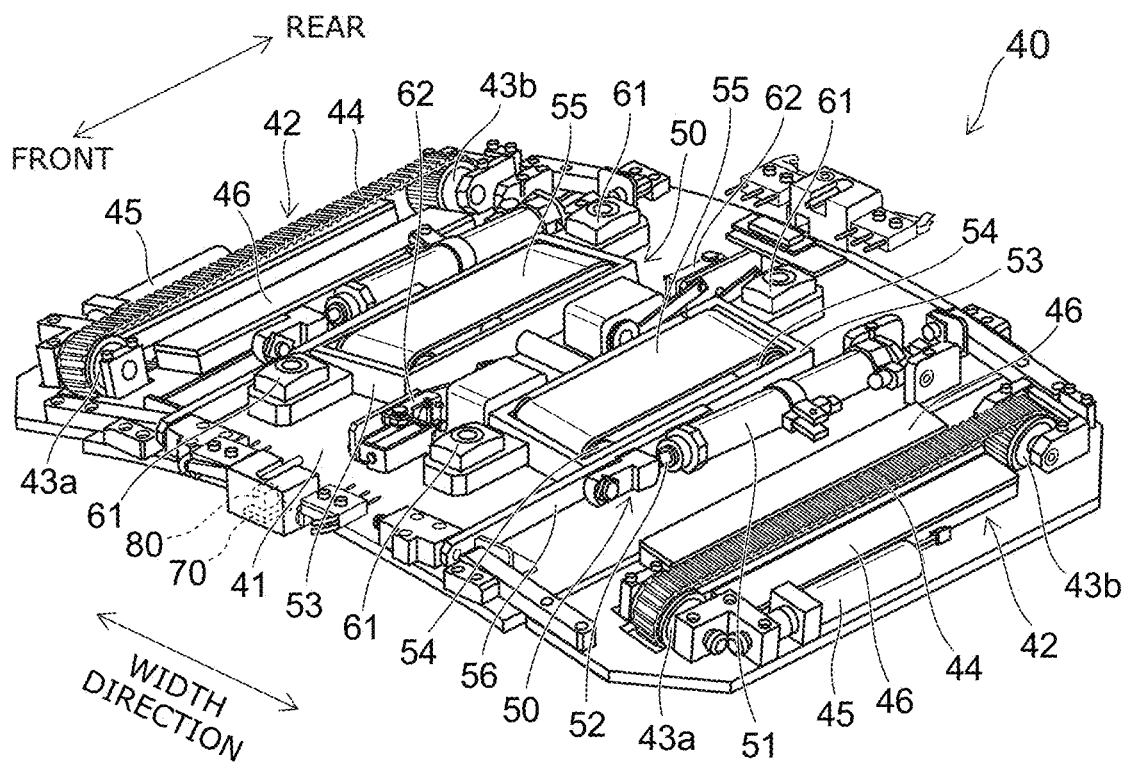
FIG. 9 is a perspective view illustrating the robot of the inspection system according to the second embodiment.

FIG. 9 is a perspective view illustrating the robot of the inspection system according to the second embodiment.

Figure 10:
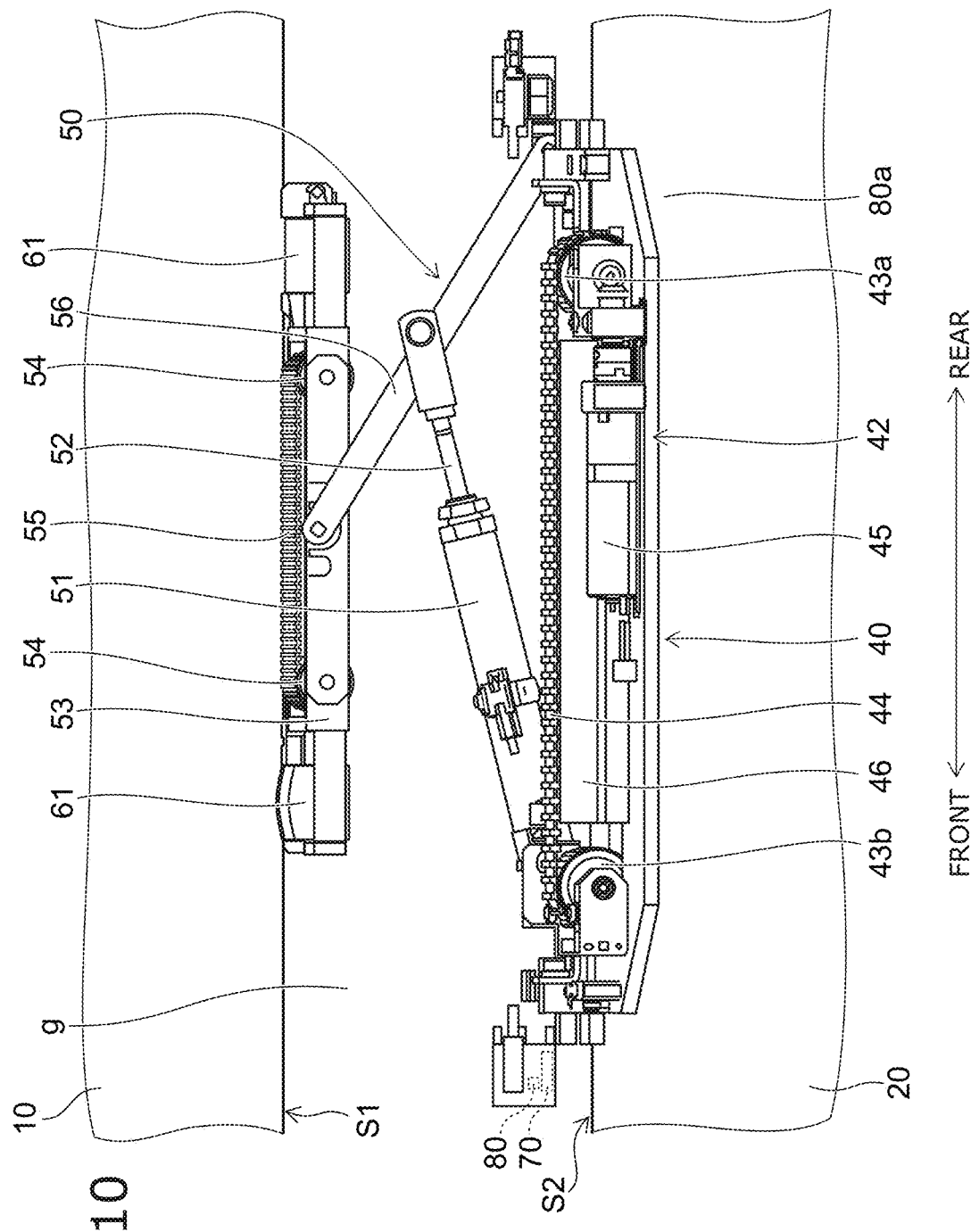
FIG. 10 is a side view illustrating the robot of the inspection system according to the second embodiment.

FIG. 10 is a side view illustrating the robot of the inspection system according to the second embodiment.

As illustrated in FIG. 9, the robot 40 includes a base plate 41, multiple movement mechanisms 42, a suction mechanism 46, and an inspection unit 50.

For example, the base plate 41 is curved along the surface of the rotor 20.

The robot 40 is moved in a frontward/rearward direction by the multiple movement mechanisms 42. The multiple movement mechanisms 42 are separated from each other in a width direction perpendicular to the frontward/rearward direction. Each of the movement mechanisms 42 includes a pair of pulleys 43a and 43b, a belt 44, and a motor 45.

The pulleys 43a and 43b are separated from each other in the frontward/rearward direction. The belt 44 is laid over the pulleys 43a and 43b. The belt 44 is exposed on the lower surface side (the rotor 20 side) of the base plate 41. For example, the motor 45 is linked to the pulley 43a and rotates the pulley 43a. By the rotation of the pulley 43a, the belt 44 is driven; and the robot 40 is moved. Also, the movement direction of the robot 40 can be changed by adjusting the rotation amount of the pulley 43a of one of the movement mechanisms 42 and the rotation amount of the pulley 43a of the other of the movement mechanisms 42.

The suction mechanism 46 is disposed at the side of the belt 44. The robot 40 can be moved over the surface of the rotor 20 while being held to the surface of the rotor 20 by the suction mechanism 46. For example, the suction mechanism 46 performs electrostatic attachment utilizing static electricity or performs vacuum attachment utilizing a pressure difference. The robot 40 is moved or stopped on the surface of the rotor 20 by adjusting the drive force due to the movement mechanisms 42 and the holding force due to the suction mechanism 46.

The inspection unit 50 is provided on the base plate 41. For example, two inspection units 50 are provided and are separated from each other in the width direction. The inspection unit 50 includes an air cylinder 51, an arm 56, a travel guide described below, a sensor 61, and a sensor 62.

The arm 56 is linked to a drive rod 52 of the air cylinder 51. As illustrated in FIG. 10, one end portion of the arm 56 is moved vertically using the other end portion of the arm 56 as a fulcrum when the drive rod 52 is extended by the driving of the air cylinder 51. A pair of guide rollers 54 is separated from each other in the frontward/rearward direction. A belt 55 is laid over the guide rollers 54.

A not-illustrated air pipe is connected to the air cylinder 51. A not-illustrated electrical cable is connected to the motor 45. Or, a battery may be mounted to the base plate 41; and the motor 45 may be driven by the battery.

The sensors 61 and 62 are, for example, electric sensors, acoustic sensors, mechanical sensors, etc. For example, the sensor 61 is an EL-CID (electro-magnetic core imperfection detector) sensor. The sensor 62 includes a hammering-test hammer driver. For example, the robot 40 performs the inspection of the generator 1 interior (the stator 10 and the rotor 20) by using the sensors 61 and 62 while moving over the surface of the rotor 20.

For example, as illustrated in FIG. 9 and FIG. 10, the illuminator 70 and the imager 80 are provided at one end in the frontward/rearward direction of the robot 40. The vent hole 25 is positioned below the robot 40 in the case where the robot 40 moves over the surface of the rotor 20. Therefore, the illuminator 70 irradiates the light below the robot 40; and the imager 80 images below the robot 40. In the case where the robot 40 moves over the surface of the stator 10, the vent hole 25 is positioned above the robot 40. Therefore, the illuminator 70 irradiates the light above the robot 40; and the imager 80 images above the robot 40.

Operations of the inspection system 200 according to the second embodiment will now be described.

Figure 11:
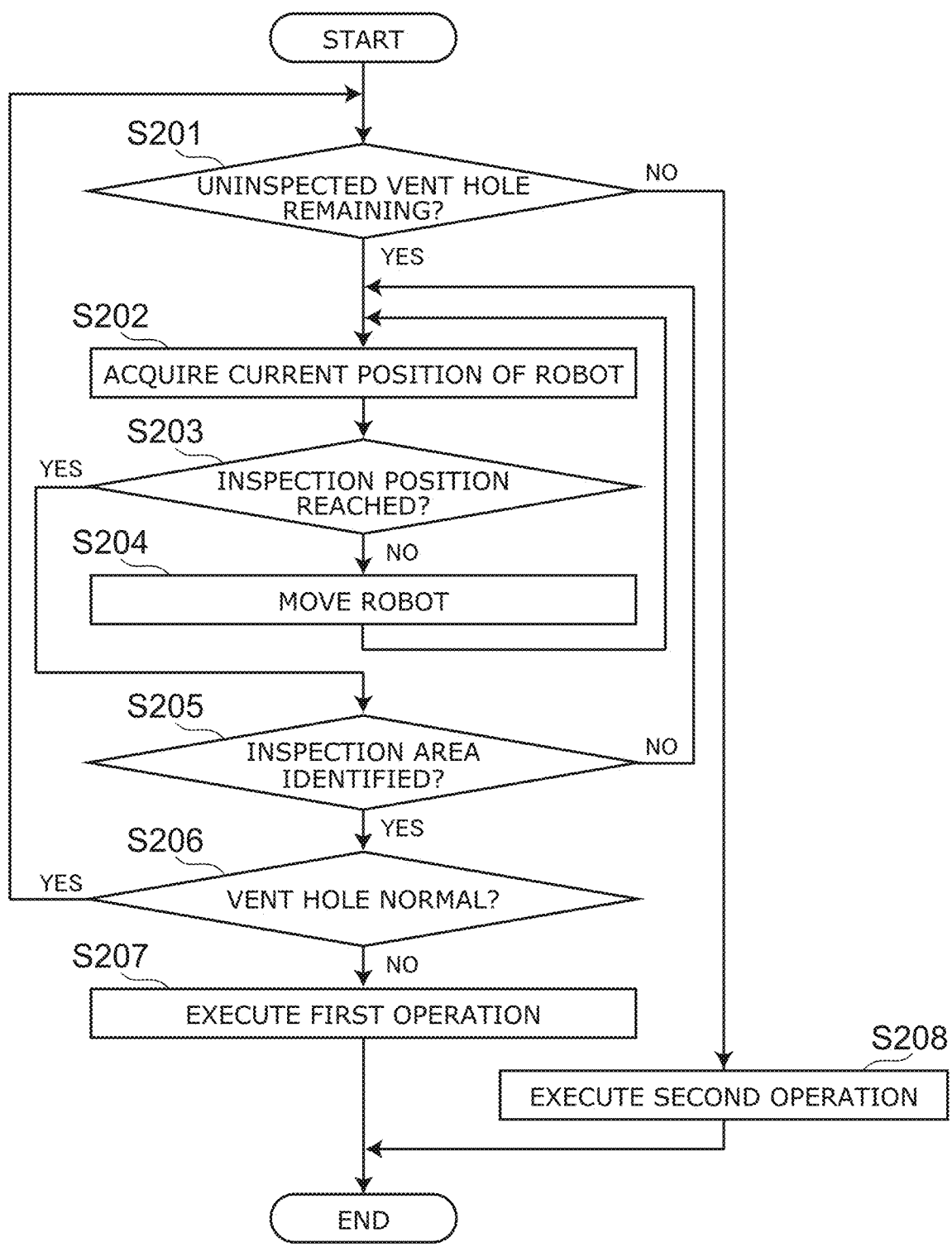
FIG. 11 is a flowchart illustrating the operations of the inspection system according to the second embodiment.

FIG. 11 is a flowchart illustrating the operations of the inspection system according to the second embodiment.

First, the processor 90 determines whether or not there are uninspected vent holes 25 (step S201). For example, the processor 90 refers to a not-illustrated memory storing the positions of the multiple vent holes 25 to be inspected. The processor 90 acquires, from the memory, the positions of the vent holes 25 for which the inspection has not yet been executed. In the case where positions are acquired, it is determined that there are still vent holes 25 to be inspected. In the case where a position is not acquired, it is determined that there are no vent holes 25 to be inspected.

In the case where there are vent holes 25 for which the inspection has not yet been executed, the processor 90 acquires the current position of the robot 40 (step S202). For example, the processor 90 calculates the current position of the robot 40 by using the initial position of the robot 40 and the movement distance of the robot 40.

The processor 90 determines whether or not the robot 40 has reached the inspection position (step S203). For example, the processor 90 determines whether or not the current position of the robot 40 matches the position of the vent hole 25 to be inspected.

In the case where the robot 40 has not reached the inspection position, the processor 90 moves the robot 40 (step S204). In the case where the robot 40 has reached the inspection position, the processor 90 determines whether or not the inspection area can be identified from the image acquired by the imager 80 (step S205).

In the case where the inspection area cannot be identified, the flow returns to step S202. Thereby, the identification of the inspection area is executed again based on the image acquired by the imager 80 and the comparison between the current position of the robot 40 and the inspection position. In the case where the inspection area can be identified, the inspection of the vent hole 25 is executed (step S206). The inspection of the vent hole 25 is executed according to steps S101 to S110 of the flowchart illustrated in FIG. 4.

In the case where an abnormality is not detected in the inspection, the flow returns to step S201; and another vent hole 25 is inspected. In the case where an abnormality is detected in the inspection, the processor 90 executes a preset first operation (step S207). For example, in the first operation, the processor 90 transmits a notification to a preset email address or terminal. The notification indicates that the abnormality of the vent hole 25 is detected.

In the case where there is no vent hole 25 to be inspected in step S201, the processor 90 executes a preset second operation (step S208). For example, in the second operation, the processor 90 moves the robot 40 toward a prescribed position (outside the generator 1, etc.). Also, the determination result that there is no vent hole 25 to be inspected in step S201 indicates that all of the vent holes 25 are normal. Therefore, in the second operation, the processor 90 may transmit a notification that the vent holes 25 are normal to the preset email address or terminal.

The following operations may be executed instead of steps S201 to S205.

The imager 80 continuously images the surface of the rotor 20 while the robot 40 moves over the surface of the rotor 20. The processor 90 stops the robot 40 when an inspection area is identified from the image acquired by the imager 80. Subsequently, the inspection of the vent hole 25 is executed. In such a case, for example, it is determined that there is no vent hole 25 to be inspected when the current position of the robot 40 reaches a prescribed region of the rotor 20.

According to the inspection system 200 according to the second embodiment, the vent holes 25 can be inspected by moving the robot 40 in the generator 1 interior. Therefore, it is unnecessary to remove the rotor 20 from the stator 10; and the vent holes 25 can be inspected efficiently.

The vent holes 25 may be inspected by moving the robot 40 over the surface of the stator 10. More favorably, the robot 40 is moved over the surface of the rotor 20. By moving the robot 40 over the surface of the rotor 20, the illuminator 70 and the imager 80 can be positioned more proximal to the vent hole 25; and the depthward side of the vent hole 25 can be inspected more accurately.

The case is described in the examples described above where vent holes provided in a generator are inspected by the inspection system and the inspection method according to the embodiments. The inspection system and the inspection method according to the embodiments may be used to inspect holes other than those of a generator. For example, the inspection system and the inspection method according to the embodiments may be used to inspect the blockage of a vent hole of a building, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An inspection system, comprising:
   an illuminator configured to irradiate light into an interior of a hole;
   an imager configured to acquire a first image by imaging the interior of the hole where the light is irradiated; and
   a processor configured to detect a blockage of at least a portion of the hole based on a luminance of the hole in the first image,
   wherein the processor is further configured to generate a binary image using a first color and a second color by binarizing the first image,
   the processor is further configured to perform a first processing of detecting at least one particle of the first color from the binary image, and
   the processor is further configured to perform at least one selected from
      a second processing of calculating a first distance between a center of a second opening and a centroid of a first particle displayed by the first color using the binary image and determining that the blockage has occurred when the first distance is not within a preset distance range, and
      a third processing of calculating a first surface area of the first particle and determining that the blockage has occurred when the first surface area is not within a preset surface area range.

2. The system according to claim 1, wherein
   the illuminator includes a light source, a lens, and a mirror,
   the light source is configured to radiate light toward the mirror,
   the lens is provided between the light source and the mirror and is configured to refract the light to be aligned with a direction from the light source toward the mirror,
   the mirror is configured to reflect the refracted light toward the hole, and
   the mirror is positioned between the hole and the imager when acquiring the first image.

3. The system according to claim 1, wherein
   the hole is provided in a rotor of a generator,
   the rotor includes:
      a stacked body including a plurality of coils and a plurality of insulating bodies provided alternately in a first direction, a first opening piercing the stacked body in the first direction; and
      a fixing member fixing the stacked body and being provided on the stacked body, the second opening piercing the fixing member in the first direction,
   the hole is formed of the first opening and the second opening overlapping in the first direction,
   the stacked body includes a first portion overlapping the second opening in the first direction, and
   the first image includes the first portion exposed through the second opening.

4. The system according to claim 1, wherein
   the processor is further configured to perform a fourth processing of determining that the blockage has occurred when a number of the particles is different from a preset reference value.

5. The system according to claim 1, wherein
   the processor is further configured to perform both of the second processing and the third processing.

6. The system according to claim 1, wherein, when the second processing is performed,
   the first distance is calculated by the processor using a focal length of the imager, a size of an image sensor included in the imager, and a distance between the centroid and the center in the binary image, and the distance range is set by the processor based on an actual distance between a centroid of the first portion and the center of the second opening.

7. The system according to claim 6, wherein, when the second processing is performed,
a lower limit of the distance range is set by the processor to be not less than 0.6 times and not more than 0.8 times the actual distance, and
an upper limit of the distance range is set by the processor to be not less than 1.2 times and not more than 1.4 times the actual distance.

8. The system according to claim 1, wherein, when the third processing is performed,
the first surface area is calculated by the processor using a surface area of the first particle in the binary image, a focal length of the imager, and a size of an image sensor included in the imager, and
the surface area range is set by the processor based on an actual surface area of the first portion.

9. The system according to claim 8, wherein, when the third processing is performed,
a lower limit of the surface area range is set by the processor to be not less than 0.90 times and not more than 0.99 times the actual surface area, and
an upper limit of the surface area range is set by the processor to be not less than 1.01 times and not more than 1.10 times the actual surface area.

10. The system according to claim 1, wherein the processor is further configured to detect an outer edge of the second opening and detect the blockage using an area on an inner side of the outer edge in the first image.

11. The system according to claim 1, further comprising a robot,
the illuminator and the imager being provided in the robot.

12. The system according to claim 11, wherein the robot is configured to move over the rotor.

13. An inspection method, comprising:
irradiating light into an interior of a hole;
acquiring a first image by imaging the interior of the hole where the light is irradiated;
generating a binary image using a first color and a second color by binarizing the first image;
detecting at least one particle of the first color from the binary image; and
detecting a blockage in at least a portion of the hole, wherein
in the detecting the blockage, at least one selected from a second processing and a third processing is performed,
in the second processing, a first distance between a center of a second opening and a centroid of a first particle displayed by the first color is calculated using the binary image, and it is determined that the blockage has occurred when the first distance is not within a preset distance range,
in the third processing, a first surface area of the first particle is calculated and it is determined that the blockage has occurred when the first surface area is not within a preset surface area range.

14. The method according to claim 13, wherein
the hole is provided in a rotor of a generator,
the rotor includes:
a stacked body including a plurality of coils and a plurality of insulating bodies provided alternately in a first direction, a first opening piercing the stacked body in the first direction; and a fixing member fixing the stacked body and being provided on the stacked body, the second opening piercing the fixing member in the first direction,
the hole is formed of the first opening and the second opening overlapping in the first direction,
the stacked body includes a first portion overlapping the second opening in the first direction, and
the first image includes the first portion exposed through the second opening.

15. The method according to claim 14, wherein the step of determining the blockage comprises performing a fourth processing,
the fourth processing including determining that the blockage has occurred when a number of the particles is different from a preset reference value.

16. The method according to claim 14,
wherein both of the second processing and the third processing are performed in the detecting.

17. An apparatus, comprising:
a processor configured to
receive a first image, an interior of a hole being imaged in the first image,
detect a blockage of at least a portion of the hole based on a luminance of the hole inside the first image,
generate a binary image using a first color and a second color by binarizing the first image, and
perform a first processing of detecting at least one particle of the first color from the binary image,
wherein the processor is further configured to perform at least one selected from
a second processing of calculating a first distance between a center of an opening and a centroid of a first particle displayed by the first color using the binary image and determining that the blockage has occurred when the first distance is not within a preset distance range, and
a third processing of calculating a first surface area of the first particle and determining that the blockage has occurred when the first surface area is not within a preset surface area range.

18. A non-transitory computer-readable storage medium storing a program, the program, when executed, causing a computer to
receive a first image, an interior of a hole being imaged in the first image,
detect a blockage of at least a portion of the hole based on a luminance of the hole inside the first image,
generate a binary image using a first color and a second color by binarizing the first image,
perform a first processing of detecting at least one particle of the first color from the binary image, and
at least one selected from
a second processing of calculating a first distance between a center of an opening and a centroid of a first particle displayed by the first color using the binary image and determining that the blockage has occurred when the first distance is not within a preset distance range, and
a third processing of calculating a first surface area of the first particle and determining that the blockage has occurred when the first surface area is not within a preset surface area range.

* * * * *